(12) United States Patent
Ehara et al.

(10) Patent No.: US 7,911,529 B2
(45) Date of Patent: Mar. 22, 2011

(54) DIGITAL CAMERA AND PERSONAL DIGITAL ASSISTANT WITH THE SAME

(75) Inventors: Yusuke Ehara, Saitama (JP); Nobuaki Watanabe, Tokyo (JP); Yoshiyuki Ozeki, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 543 days.

(21) Appl. No.: 11/882,067

(22) Filed: Jul. 30, 2007

(65) Prior Publication Data

US 2008/0030604 A1 Feb. 7, 2008

(30) Foreign Application Priority Data

Jul. 31, 2006 (JP) ................... 2006-208183

(51) Int. Cl.
*H04N 5/235* (2006.01)
*H04N 3/16* (2006.01)
(52) U.S. Cl. ........................ 348/362; 348/296
(58) Field of Classification Search .................. None
See application file for complete search history.

(56) References Cited

U.S. PATENT DOCUMENTS

| 5,258,805 A | * | 11/1993 | Aoki et al. | ............. 396/292 |
| 6,749,348 B2 | * | 6/2004 | Seita | ............. 396/443 |
| 2003/0147001 A1 | * | 8/2003 | Kikuchi et al. | ............. 348/363 |
| 2004/0105028 A1 | * | 6/2004 | Watanabe | ............. 348/363 |
| 2006/0087573 A1 | * | 4/2006 | Harada | ............. 348/294 |

FOREIGN PATENT DOCUMENTS

| JP | 8-220584 | 8/1996 |
| JP | 9-43676 | 2/1997 |
| JP | 2000-47283 | 2/2000 |

* cited by examiner

*Primary Examiner* — Luong T Nguyen
(74) *Attorney, Agent, or Firm* — Wenderoth, Lind & Ponack, L.L.P.

(57) ABSTRACT

A digital camera includes at least one shutter blade in which opening and closing operations of an exposure aperture are performed using an electromagnetic actuator. The digital camera also includes an image sensor converting light from an object into image information, and an image processing circuit which stores the image information converted by the image sensor in an image memory so that the image information can be fetched and such that the image processing circuit has terminals for connecting the image processing circuit to an estimation display device. Further, the digital camera includes an exposure control circuit including a reference table controlling the amount of light exposure and at least one correction table allowing the amount of light exposure controlled by the reference table to be corrected, and includes a driving circuit driving the electromagnetic actuator according to an output signal of the exposure control circuit.

3 Claims, 6 Drawing Sheets

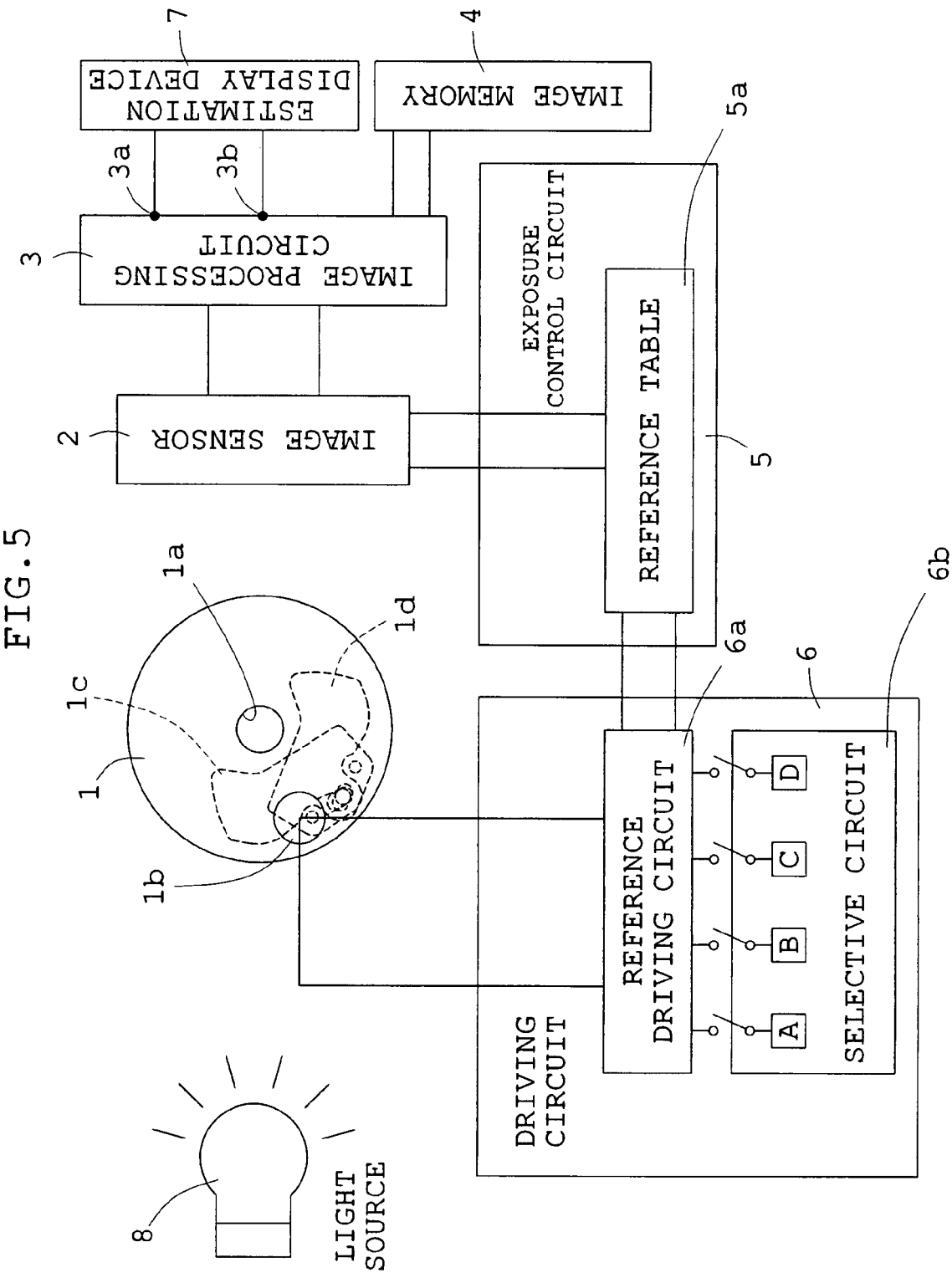

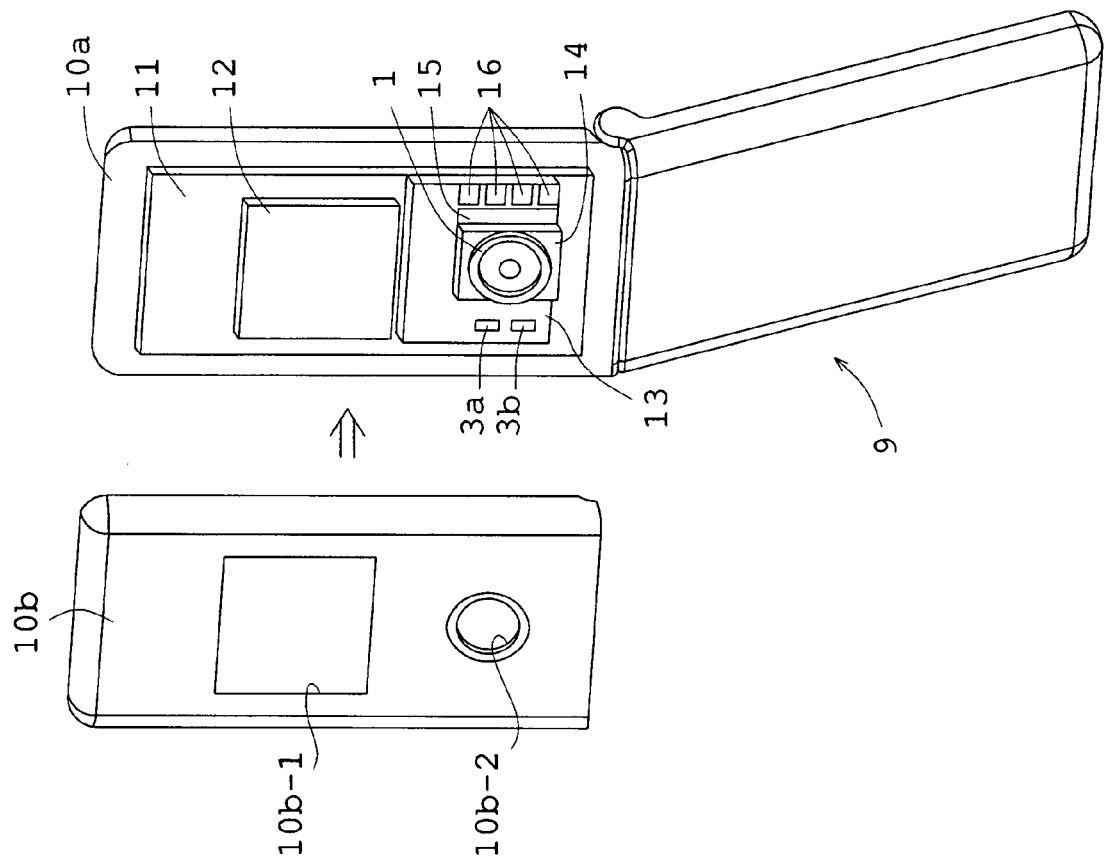
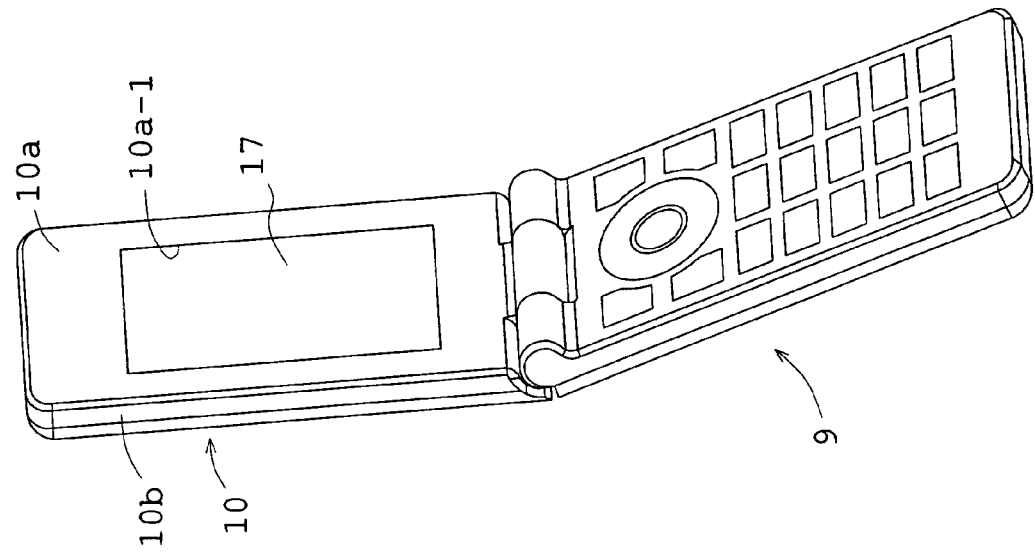

DIGITAL CAMERA AND PERSONAL DIGITAL ASSISTANT WITH THE SAME

BACKGROUND OF THE INVENTION

1. Field of the Invention

This invention relates to a digital camera incorporating a small-sized shutter device unit and a personal digital assistant provided with this digital camera.

2. Description of Related Art

In general, a camera shutter device is previously unified as a component of a camera and is incorporated in a camera body, together with other parts and components, when the camera is fabricated. Because a favorable photographic image cannot be obtained if exposure control is improper, the shutter device is a component that is extremely important for the camera. The shutter device has formerly been fabricated, such that, at completion of fabrication, the shutter device is incorporated to a shutter unit, which is then incorporated into the camera, wherein readjustment of the shutter device is unnecessary.

The shutter device, as is well known, is constructed with numerous parts. In the is fabrication, since each of these parts has an allowable error, individual differences arise among shutter devices at the stage of assembly and some of the shutter devices fail to secure proper control of the amount of exposure within tolerances. Thus, formerly, all shutter devices have been inspected at the stage of assembly and various mechanical and/or electrical adjusting operations have been performed with respect to the shutter devices failing to secure proper control of the amount of exposure. One technique for performing such adjusting operations is set forth in Japanese Patent Kokai No. 2000-47283.

In recent years, however, digital cameras provided with image sensors such as CCDs have become popular, such that extremely small-sized digital cameras are housed in mobile phones and personal digital assistances, called PDAs. In such a digital camera, the photoelectric conversion performance of the image sensor, as well as the shutter device, is a factor which is important for obtaining the proper amount of exposure in photography. Even in the case of the image sensor, however, the allowable error is provided in its fabrication, and thus even when the shutter device is fabricated as mentioned above, the amount of exposure is sometimes not properly controlled at the stage in which the shutter device is incorporated in the camera and is connected to the image sensor for photography. In a conventional digital camera, therefore, after the shutter device and the image sensor are incorporated in the camera body, estimation is made as to whether the proper control of the amount of exposure is carried out so that this amount is adjusted according to the need.

The method of this estimation is that after the shutter device and the image sensor are incorporated in the camera body, the exposure control program of a reference table housed in the camera is used to perform photography under the light source of a is reference amount of light so that estimation is made as to whether the amount of exposure is within a proper range of the reference, and at the same time, so that when it is out of the proper range of the reference, estimation is made as to how large an amount of exposure deviates from the proper range of the reference. In the method of adjusting this amount, it is common practice to use an exposure control program without displacing the shutter device and the image sensor.

In the digital camera, as mentioned above, it is necessary to ascertain whether the amount of exposure can be properly controlled at the stage in which the shutter device and the image sensor are incorporated in the camera body and, if not, to make adjustment so that the amount of exposure can be properly controlled. Conventional digital cameras, therefore, have been designed so that, in order to make such adjustment, an estimation is made as to whether the amount of exposure is within the proper range of the reference, and if not, all of a means of estimating how large an amount of exposure deviates from the proper range of the reference, a plurality of correction means in which the amount of exposure can be corrected in accordance with the deviation amount, and a means of automatically selecting the correction means in accordance with the deviation amount are incorporated in an individual camera. Consequently, there is the problem that an electronic circuit housed in the camera involves a very high cost. Moreover, since electronic parts become bulky and increase in number, a substrate mounted with them also becomes bulky to bring about the problem that this is very disadvantageous for a compact digital camera and a camera housed in the personal digital assistant such as a mobile phone.

BRIEF SUMMARY OF THE INVENTION

It is, therefore, an object of the present invention to provide a digital camera which is advantageous for compact and low-cost designs, constructed so that after the shutter device and the image sensor are separately incorporated in the camera body without requiring many and bulky electronic parts mentioned above, so that an estimation can be made as to whether proper control of the amount of exposure is carried out and the amount of exposure can be adjusted according to the need, and to provide a personal digital assistant having the above-mentioned digital camera.

In order to achieve the above object, the digital camera of the present invention is constructed to comprise: at least one shutter blade in which opening and closing operations of an exposure aperture are performed by an electromagnetic actuator; an image sensor photoelectrically converting light from an object into image information in accordance with photography; an image processing circuit in which the image information converted by the image sensor is stored into an image memory and then can be fetched and which has terminals for connecting the image processing circuit to an estimation display device in order to fetch the image information from the image memory in the assembly adjustment of the camera to ascertain the amount of light for photography; an exposure control circuit provided with a reference table for controlling the amount of exposure and at least one correction table which allows the amount of light controlled by the reference table to be corrected so that the correction table is selectively connected to the reference table, according to the need, on the basis of the result of the estimation of the estimation display device in the assembly adjustment of the camera; and a driving circuit in which the electromagnetic actuator is driven by an output signal of the exposure control circuit. In this case, it is favorable that the correction table is provided as a plurality of correction tables in accordance with different amounts of correction so that the plurality of correction tables are selectively connected to the reference table through a soldered joint or a changeover switch.

Further, in order to achieve the above object, the digital camera of the present invention may be constructed to comprise: at least one shutter blade in which opening and closing operations of an exposure aperture are performed by an electromagnetic actuator; an image sensor photoelectrically converting light from an object into image information in accordance with photography; an image processing circuit in which the image information converted by the image sensor is stored into an image memory and then can fetched and which has terminals for connecting the image processing circuit to an estimation display device in order to fetch the image information from the image memory in the assembly adjustment of the camera to ascertain the amount of light for photography; an exposure control circuit controlling the amount of exposure of the image sensor in photography; and a driving circuit which is provided with a reference driving circuit and at least one correction circuit which allows the output of the reference driving circuit to be corrected so that the correction circuit is selectively connected to the reference driving circuit, according to the need, on the basis of the result of the estimation of the estimation display device in the assembly adjustment of the camera, and in which the electromagnetic actuator is driven by the output signal of the exposure control circuit in photography. In this case, it is favorable that the correction circuit is provided as a plurality of correction circuits in accordance with different amounts of correction so that the plurality of correction circuits are selectively connected to the reference driving circuit through a soldered joint or a changeover switch.

When the personal digital assistant, such as the mobile phone, houses this digital camera, its structure becomes extremely favorable.

The digital camera of the present invention and the personal digital assistant provided with this digital camera are designed so that when the shutter device and the image sensor are separately incorporated in the camera body, the estimation display device that is an external device is connected to the image processing circuit of the camera in test photography only, and so that if the amount of exposure cannot be properly controlled as a result of the test photography, which correction means should be selected is displayed on the estimation display device and a preset correction means provided in the exposure control circuit or the driving circuit is selected in accordance with this display. As such, it is not necessary that the circuit for making estimation is provided in an individual camera as conventional practice, and compact and low-cost designs of the camera becomes possible. In the personal digital assistant housing such a camera, compactness becomes possible and the number of degrees of internal design freedom is increased.

These and other features and advantages of the present invention will become apparent from the following detailed description of the preferred embodiments when taken in conjunction with the accompanying drawings.

BRIEF DESCRIPTION OF THE DRAWINGS

FIG. 5 is a block diagram showing a system construction of the camera of Embodiment 2 in the present invention; and FIGS. 6A and 6B are perspective views showing the use of a folding mobile phone of Embodiment 3 housing the digital camera, viewed from the inside and the outside by removing an armored cover, respectively.

DETAILED DESCRIPTION OF THE INVENTION

Three aspects of the present invention will be explained in accordance with three embodiments.

Embodiment 1

Figure 1:
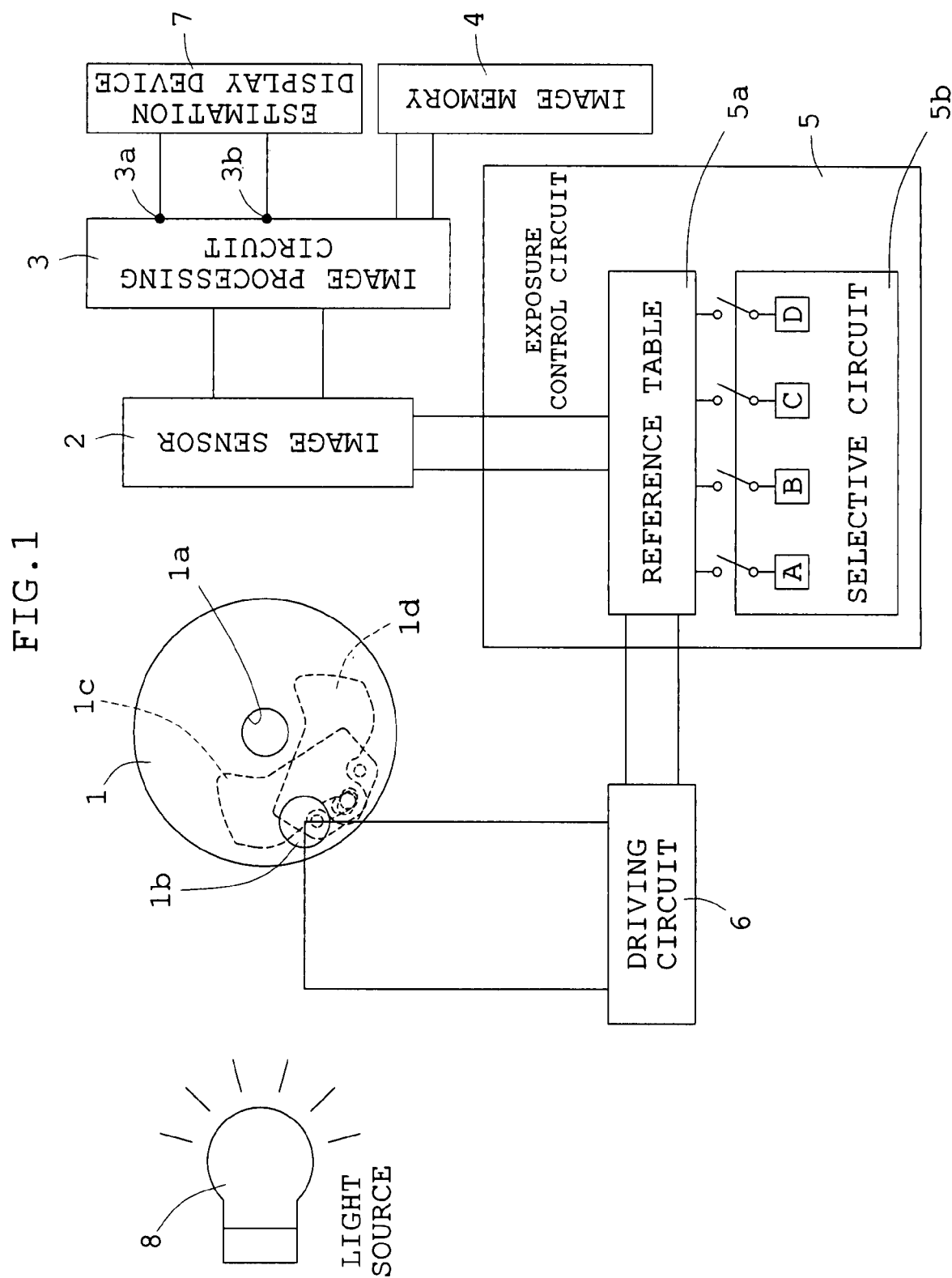
FIG. 1 is a block diagram showing a system construction of the camera of Embodiment 1 in the present invention.

A shutter device 1 shown in FIG. 1 has an exposure aperture 1a and includes a motor 1b and two shutter blades 1c and 1d.

Although in FIG. 1 the motor 1b is shown schematically, its specific structure is substantially the same as in the case of an electromagnetic actuator set forth, for example, in Japanese Patent Kokai No. 2006-11293, in which a U-shaped yoke around which a coil is wound is provided as a stator and a rotor having a permanent magnet is integrally provided with a driving pin connected to the shutter blades. The rotor is constructed so is that it is rotated only in the range of a preset angle in a direction coinciding with the direction of an electric current supplied to the stator coil.

The electromagnetic actuator of the present invention, however, is not limited to a current-controlled motor constructed as mentioned above and may be a different type of current-controlled motor. Also, it is not limited to the current-controlled motor and may be a step motor or an electromagnetic plunger.

When the rotor of the motor 1b is rotated, the two shutter blades 1c and 1d of this embodiment are rotated in opposite directions at the same time so that the exposure aperture 1a is opened and closed by their reciprocating rotation.

The present invention, however, may be designed so that only one of these blades is adopted and the exposure aperture 1a is opened and closed by the reciprocating rotation of a single shutter blade.

In addition to the shutter device 1 mentioned above, the digital camera of Embodiment 1 has an image sensor 2 such as a CCD, an image processing circuit 3, an image memory 4, an exposure control circuit 5, and a driving circuit 6 for the motor 1b.

Of these, the image processing circuit 3 is capable of storing image information photoelectrically converted by the image sensor 2 after photography into the image memory 4, fetching the image information from the image memory 4 to display a photographed image on a liquid crystal display device, not shown, and displaying an image of an object to be photographed by the image information photoelectrically converted by the image sensor 2 on the liquid crystal display device, and has two terminals 3a and 3b by which the image processing circuit 3 can be temporarily connected with an estimation display device 7.

The exposure control circuit 5 is provided for the purpose that when a photographing start signal is input, the count of time determined by the measuring result of light from the object (different from exposure time) is started, and when the count is ended, an end signal is output to the driving circuit 6.

The exposure control circuit 5 of Embodiment 1 includes a reference table 5a and a selective circuit 5b having four correction tables A, B, C, and D so that any one of the correction tables can be connected to the reference table 5a.

The driving circuit 6 is such that a forward current is supplied to the stator coil of the motor 1b by the output signal from the exposure control circuit 5 to cause the shutter blades 1c and 1d to perform the closing operation of the exposure aperture 1a, and after preset time passes, a reverse current is supplied to the stator coil by the output signal from the exposure control circuit 5 to cause the shutter blades 1*c* and 1*d* to perform the opening operation of the exposure aperture 1*a*.

Subsequently, the method of adjusting the exposure time in the digital camera constructed mentioned above will be explained using FIGS. 2-4 as well as FIG. 1. The shutter device 1 and the image sensor 2 of Embodiment 1 are accepted as good units at their fabrication stages. However, in a state where they are incorporated in the camera, sometimes the amount of exposure cannot be properly controlled, depending on a combination of the camera, the shutter device 1 and the image sensor 2. Hence, it is necessary to ascertain whether the amount of exposure is properly controlled in a state where they are incorporated. In this case, as shown in FIG. 1, the estimation display device 7 is connected to the terminals 3*a* and 3*b* of the image processing circuit 3. On the other hand, at this time, none of the four correction tables A, B, C, and D provided in the selective circuit 5*b* of the exposure control circuit 5 is connected to the reference table 5*a*. Under such a state, a reference light source 8 of preset brightness is used and test photography is performed.

Figure 2:
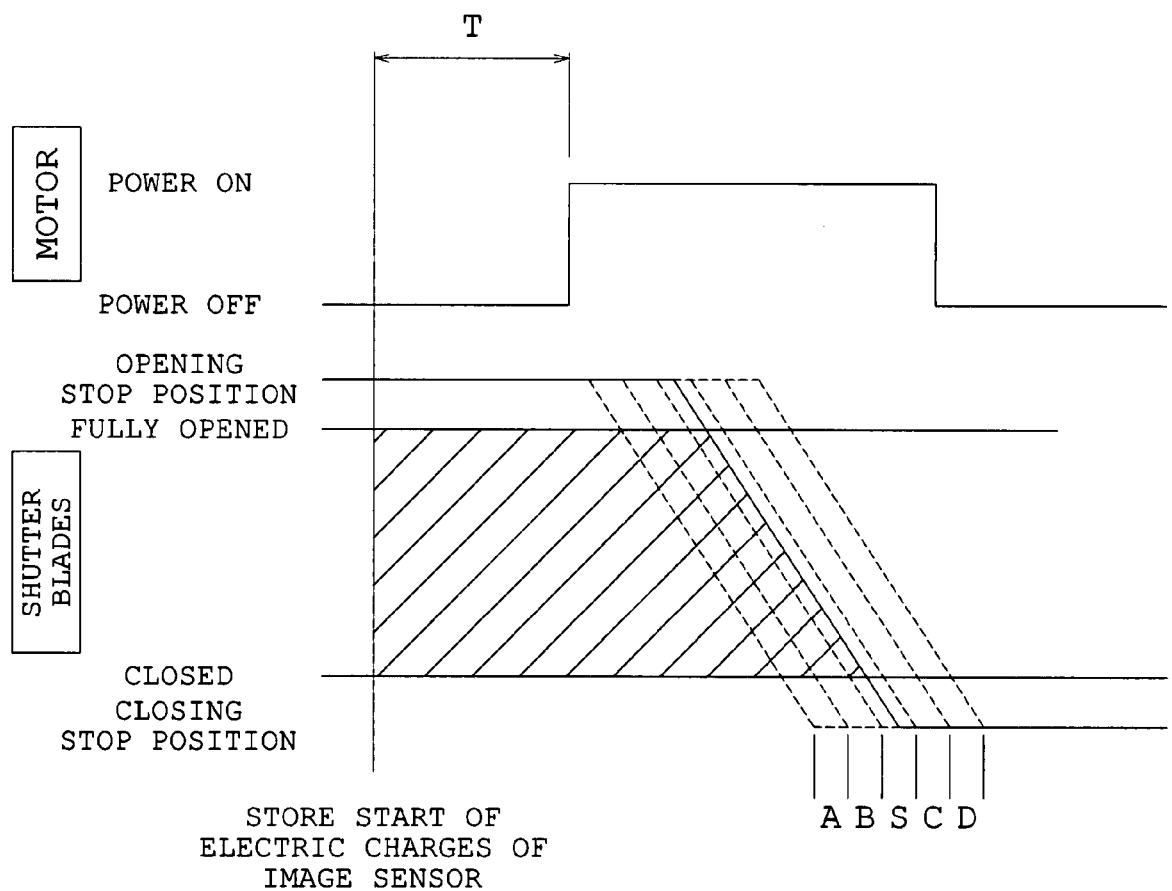
FIG. 2 is a timing chart for explaining one example of an individual difference between shutter devices caused when cameras are fabricated.

When a release button (a switch) is pushed for test photography, electric charges having been stored in the image sensor 2 are discharged by a release signal. Whereby, as shown in FIG. 2, the store of the electric charges for photography is started with respect to the image sensor 2, and at the same time, the count of a time T automatically determined according to the brightness of light from the object is started by the reference table 5*a* of the exposure control circuit 5. After that, when the time T passes, the forward current is supplied to the stator coil of the motor 1*b* from the driving circuit 6 by its output signal, and thus the shutter blades 1*c* and 1*d* start the closing operation of the aperture 1*a* from their opening stop positions. When the closing operation of the shutter blades 1*c* and 1*d* is stopped, imaging information is stored into the image memory 4 through the image processing circuit 3, but in this case, the estimation display device 7 is connected to the image processing circuit 3 and hence the imaging information is fetched from the image memory 4 and is also input in the estimation display device 7. After that, when the preset time passes, the reverse current is supplied to the stator coil of the motor 1*b* from the driving circuit 6, and thus the shutter blades 1*c* and 1*d* start the opening operation of the aperture 1*a* from their closing stop positions and, upon fully opening the aperture 1*a*, stop at the opening stop positions.

As is well known, a time lag is necessarily produced between the moment of the start of the supply of the forward current to the stator coil and the moment of the start of the closing operation of the shutter blades 1*c* and 1*b*. The time lag varies with a combination of an individual difference of the shutter device 1 and that of the image sensor 2. The time between the start of the closing operation of the shutter blades 1*c* and 1*d* and the end thereof, namely, the working speed of the shutter blades 1*c* and 1*d* varies with a combination of an individual difference of the motor 1*b* and each individual difference of the shutter blades 1*c* and 1*d*. At the fabrication stage, the test photography is performed by a combination of the former combination condition with the latter combination condition.

However, it is not easy to explain this matter with respect to the figures. Thus, an example of the individual difference produced in the case where any shutter device 1 fabricated is designed so that the working speed of the shutter blades 1*c* and 1*d* is exactly the same and so that the time between the start of the closing operation of the shutter blades 1*c* and 1*d* and the start of an actual closure of the aperture 1*a* is also exactly the same will be explained using FIG. 2, and an example of the individual difference produced in the case where the time between the moment of the start of the supply of the forward current to the stator coil and the moment of the start of the closing operation of the shutter is blades 1*c* and 1*b* is exactly the same will be explained using FIG. 3.

In FIG. 2, solid lines indicate the case where, when normal time passes after the supply of the forward current to the stator coil is started in performing the test photography, the shutter blades 1*c* and 1*d* start the closing operation from normal opening stop positions at a normal working speed and stop at the closing stop positions. Specifically, a region indicated by oblique lines means the amount of exposure according to a design value. However, as a matter of course, this amount of exposure also has the tolerance. Thus, in Embodiment 1, it is estimated that, when the amount of exposure where the closing operation of the shutter blades 1*c* and 1*d* is carried out within a range of S is obtained, the amount of exposure is properly controlled. However, the time between the start of the supply of the forward current to the stator coil and the start of the closing operation of the shutter blades 1*c* and 1*d* actually lags, and thus the amount of exposure where the operation of the shutter blades 1*c* and 1*d* is carried out within a range of any of A, B, C, and D is sometimes obtained.

Figure 3:
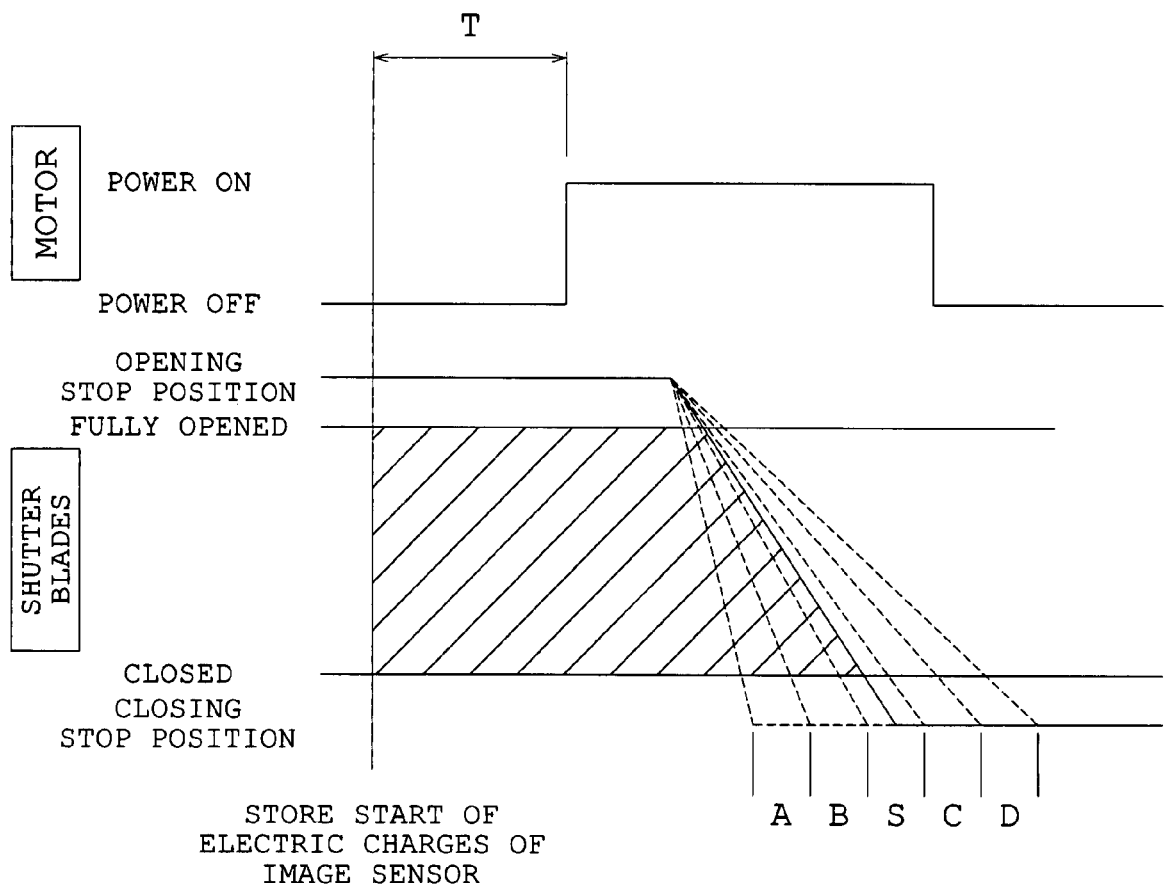
FIG. 3 is a timing chart for explaining another example of the individual difference between shutter devices caused when cameras are fabricated.

In FIG. 3, solid lines indicate the case where when normal time passes after the supply of the forward current to the stator coil is started in performing the test photography, the shutter blades 1*c* and 1*d* start the closing operation from normal opening stop positions at a normal working speed and stop at the closing stop positions. Thus, in this case also, a region indicated by oblique lines means the amount of exposure according to a design value. However, this amount of exposure also has the tolerance, and thus it is estimated that, when the amount of exposure where the closing operation of the shutter blades 1*c* and 1*d* is carried out within the range of S is obtained, the amount of exposure is properly controlled. Actually, however, the working speed of the shutter blades 1*c* and 1*d* is higher or lower than a reference speed, and thereby the amount of exposure where the operation is carried out within the range of any of A, B, C, and D is sometimes obtained.

Figure 4:
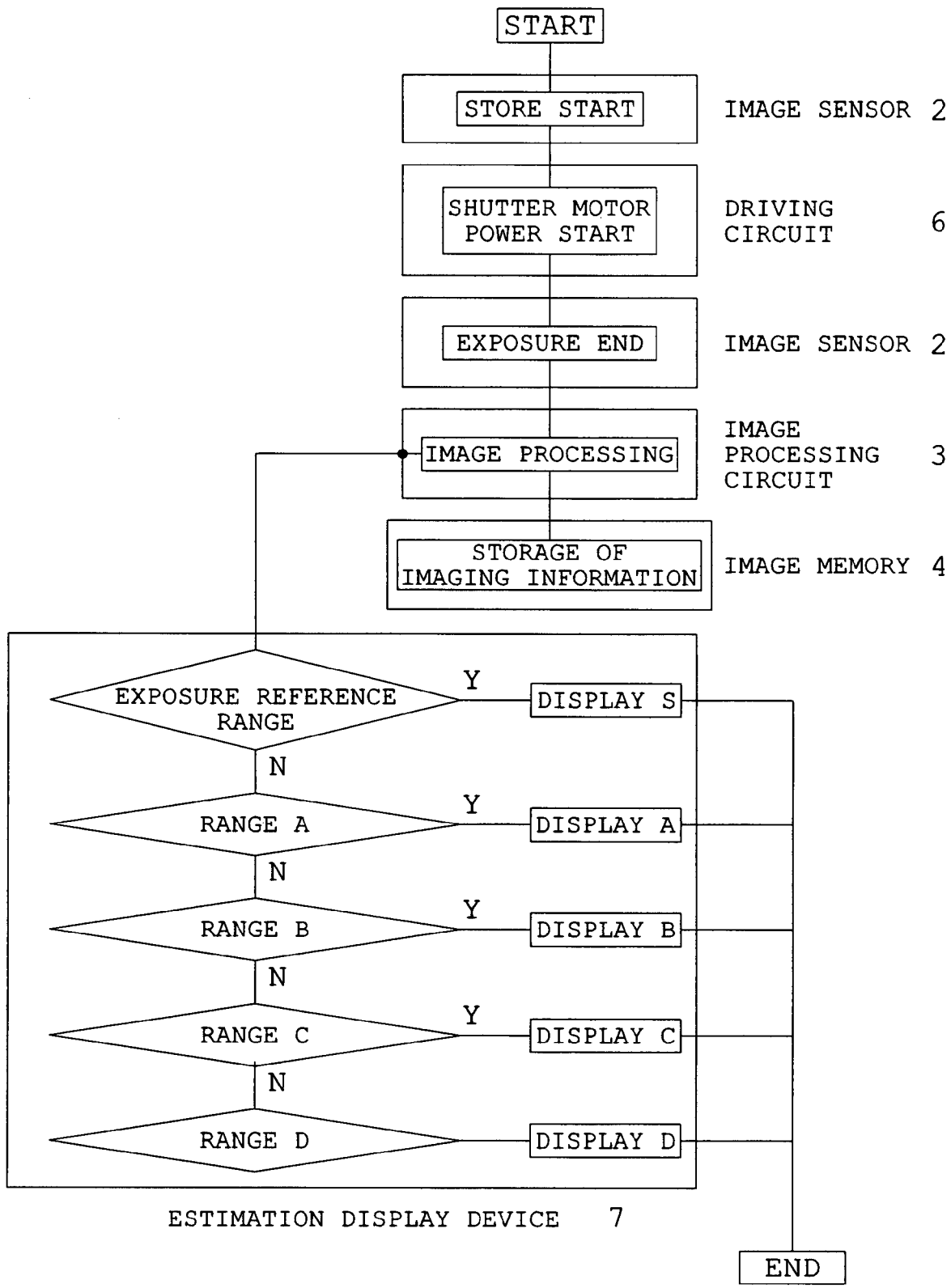
FIG. 4 is a flow chart for explaining an estimation display method of the estimation display device.

When the test photography is performed as mentioned above, the image information is also input in the estimation display device 7, and hence the estimation display device 7 checks individual items one after another in the order shown in FIG. 4 to estimate the range corresponding to the amount of exposure of an image so that the result of the estimation is displayed on a display section, not shown, by the symbol of any one of A, B, C, and D. When the symbol S is displayed on the display section, this indicates that the amount of exposure is properly controlled, and thus no adjusting work takes place. However, when any of A, B, C, and D is displayed on the display section, the correction table corresponding to the displayed symbol, of the four correction tables provided in the selective circuit 5*b* of the exposure control circuit 5, is connected to the reference table 5*a*. Whereby, the time T shown in FIG. 2 is adjusted and therefore it becomes possible for the camera to properly control the amount of exposure. When the correction table is connected to the reference table 5*a*, it is desirable to solder both terminals, but a changeover switch, such as a rotary switch or a slide switch, may be used so that a preset correction table is selected.

In Embodiment 1, as mentioned above, the work that one of the correction tables provided in the selective circuit 5*b* is connected to the reference table 5*a* becomes necessary. However, since it is possible that a huge number of cameras are checked by the single estimation display device 7, there is no need to provide a circuit for ascertaining whether the amount of exposure is properly controlled with respect to an individual camera and a program circuit for automatically connecting the preset correction table to the reference table in accordance with the result of the estimation, like conventional practice. In this way, compact and low-cost designs of the camera are achieved.

Also, the shutter device 1 of Embodiment 1 is provided with only the shutter blades 1c and 1d, but, as is well known, in addition to the shutter blades, the shutter device may be designed to have a stop blade and a filter blade, operated by another electromagnetic actuator. Although Embodiment 1 is constructed so that, as the result of the test photography, in each of cases where the amount of exposure is smaller and larger than a standard amount of exposure, the amount of exposure can be corrected at two stages, the present invention is not limited to the number of these stages for correction. For example, Embodiment 1 may be constructed so that the numbers of stages for correction of both are different or the one can be corrected at only one stage and the other cannot be corrected. The same holds for cases of Embodiments 2 and 3 described below.

Embodiment 2

This embodiment will be explained using FIG. 5, but FIGS. 2-4 are also used for the explanation of the embodiment. The method of adjusting the individual difference of the camera of Embodiment 2 is different from that in the case of the camera of Embodiment 1. Embodiment 2, however, as shown in FIG. 5, has the same structure as in FIG. 1 with the exception that specific structures of the exposure control circuit 5 and the driving circuit 6 are different. As such, in FIG. 5, reference numerals used in FIG. 1 are applied as they are. In Embodiment 2, therefore, only the specific structures of the exposure control circuit 5 and the driving circuit 6 will be explained.

As seen from FIG. 5, the exposure control circuit 5 of Embodiment 2 is not provided with the selective circuit 5b. Hence, in the exposure control circuit 5 of this embodiment, the reference table 5a shown in FIG. 1 is only provided. The driving circuit 6 of the embodiment includes a reference driving circuit 6a and a selective circuit 6b having four correction circuits A, B, C, and D so that any one of these correction circuits can be connected to the reference driving circuit 6a by soldering.

Subsequently, the method of adjusting the exposure time in the camera of Embodiment 2 will be explained using FIGS. 2-4 in addition to FIG. 5. In this case, the same structure as in Embodiment 1 is briefly explained. When, whether or not the amount of exposure is properly controlled is checked in a state where the shutter device 1 and the image sensor 2 are incorporated in the camera, the estimation display device 7 is connected to the terminals 3a and 3b of the image processing circuit 3. At this time, none of the four correction circuits A, B, C, and D provided in the selective circuit 6b of the driving circuit 6 is connected to the reference driving circuit 6a. In this state, the reference light source 8 of preset brightness is used and test photography is performed.

When the release button (the switch) is pushed, electric charges having been stored in the image sensor 2 are discharged by a release signal. Whereby, as shown in FIG. 2, the store of the electric charges is started with respect to the image sensor 2, and at the same time, the count of the time T automatically determined according to the brightness of light from the object is started by the exposure control circuit 5. After that, when the time T passes, the forward current is supplied to the stator coil of the motor 1b from the reference driving circuit 6a of the driving circuit 6 by its output signal, and thus the shutter blades 1c and 1d start the closing operation of the aperture 1a from the opening stop positions.

When the closing operation of the shutter blades 1c and 1d is stopped, imaging information is stored into the image memory 4 through the image processing circuit 3. In this case, however, the estimation display device 7 is connected to the image processing circuit 3 and hence the imaging information is fetched from the image memory 4 and is also input in the estimation display device 7. After that, when the preset time passes, the reverse current is supplied to the stator coil of the motor 1b from the reference driving circuit 6a of the driving circuit 6 by the output signal of the exposure control circuit 5, and thus the shutter blades 1c and 1d start the opening operation of the aperture 1a from the closing stop positions and, upon fully opening the aperture 1a, stop at the opening stop positions.

The shutter device 1 and the image sensor 2 are acceptance units at individual fabrication stages. However, when the test photography mentioned above is performed, as described in detail with respect to typical examples using FIGS. 2 and 3 in Embodiment 1, sometimes the amount of exposure cannot be properly controlled, depending on each individual difference. Even in the case of Embodiment 2, when the test photography is performed as mentioned above, the estimation display device 7, as in Embodiment 1, checks individual items shown in FIG. 4 to estimate the range corresponding to the amount of exposure of a photographed image so that the result of the estimation is displayed on the display section, not shown, by the symbol of any one of A, B, C, and D.

When the symbol S is displayed on the display section, this indicates that the amount of exposure is properly controlled, and thus no adjusting work takes place. However, when any one of A, B, C, and D is displayed on the display section, the correction circuit corresponding to the displayed symbol, of the four correction circuits provided in the selective circuit 6b of the driving circuit 6, is connected to the reference driving circuit 6a. Whereby, the working speed of the shutter blades 1c and 1d is changed. Specifically, as indicated by solid and dotted lines in FIG. 3, the time between the start of the closure of the aperture 1a and the end of the closure is changed without altering the moment of the start of the closing operation of the shutter blades 1c and 1d. Consequently, it becomes possible to properly control the amount of exposure. When the correction circuit displayed on the estimation display device 7 is connected to the reference driving circuit 6a, both terminals may be soldered, or a changeover switch, such as a rotary switch or a slide switch, may be used.

Embodiment 3

In accordance with FIGS. 6A and 6B, Embodiment 3 will be explained. A folding mobile phone of this embodiment, as illustrated in FIG. 6A, includes a main section 9 and subsidiary section 10 which are mutually connected, with a hinge between them. The main section 9 has the configuration of a plurality of operation keys on the inside surface where the phone is folded down. The subsidiary section 10 has a base body part 10a placed on the inside surface where the phone is folded down and an armored cover 10b placed on the outside surface where the phone is folded down. The cover 10b covers the side surface of the base body part 10a. The cover 10b, as illustrated in FIG. 6B, is configured with a square window 10b-1 and a circular window 10b-2.

As shown in FIG. 6B, the base body part 10a is mounted with a large rectangular circuit substrate 11 on its cover-10b-side surface. The circuit substrate 11 is mounted with a liquid crystal display plate 12 at a position corresponding to the window 10b-1 of the cover 10b, and a camera circuit substrate 13 as well. The shutter device 1 described in Embodiments 1 and 2 and an imaging device 14 including the image sensor 2 are made to overlap and are attached to the camera circuit substrate 13. In the case of the shutter device 1 of Embodiment 3, a single shutter blade, although not shown in the figure, is provided. A lens, not shown, mounted in front of the shutter device 1 is placed in the window 10b-2. The camera circuit substrate 13 is configured with the terminals 3a and 3b of the image processing circuit 3, a common terminal 15 provided in the reference table 5a described in Embodiment 1 or the reference driving circuit 6a in Embodiment 2, and four terminals 16 provided in the selective circuit 5b described in Embodiment 1 or the selective circuit 6b in Embodiment 2.

The circuit substrate 11 is further mounted with a rectangular liquid crystal plate 17 shown in FIG. 6A, on its base-body-part-10a side so that the liquid crystal display plate 17 is placed in a window 10a-1 of the same shape provided in the base body part 10a. In addition to the shutter device 1 and the imaging device 14, the camera circuit substrate 13 is mounted with electronic parts, not shown, constituting the image processing circuit 3, the image memory 4, the exposure control circuit 5, and the driving circuit 6 which are described in Embodiments 1 and 2, and the camera is constructed with all of these components. As is well known, the liquid display plates 12 and 17 are also used as a camera finder.

In Embodiment 3 constructed as mentioned above, at the stage after constituent members of the camera are incorporated in the camera circuit substrate 13 and before the camera circuit substrate 13 is mounted to the circuit substrate 11 of the mobile phone, namely at the stage of fabrication as a camera unit, the test photography may be performed by connecting the estimation display device 7, as explained in Embodiments 1 and 2, so that the adjusting work is carried out. However, as shown in FIG. 6B, at the stage after the camera circuit substrate 13 is mounted to the circuit substrate 11 of the mobile phone and before the base body part 10a is fitted with the cover 10b, it is also possible that the test photography is performed by bringing a probe connected to the estimation display device 7 into contact with the terminals 3a and 3b so that the adjusting work is carried out.

What is claimed is:

1. A digital camera comprising:
    a shutter blade connected to an electromagnetic actuator, such that the shutter blade is controlled by the electromagnetic actuator to open and close an exposure aperture;
    an image sensor photoelectrically converting light from an object into image information in accordance with photography;
    an image processing circuit (i) storing the image information converted from the light by the image sensor in an image memory for retrieval, and (ii) including terminals for connecting the image processing circuit to an estimation display device to enable the estimation display device to retrieve the image information from the image memory during an assembly adjustment of the digital camera to ascertain an amount of light for the photography;
    an exposure control circuit including a reference table for controlling an amount of light exposure and including a correction table allowing the amount of light exposure controlled by the reference table to be corrected, wherein the correction table is selectively connected to the reference table, according to a need based on a result of an estimation performed by the estimation display device connected to one of the terminals of the image processing circuit only when the assembly adjustment of the digital camera is performed; and
    a driving circuit driving the electromagnetic actuator according to an output signal of the exposure control circuit.

2. A digital camera according to claim 1,
    wherein the exposure control circuit includes a plurality of correction tables, and
    wherein each of the plurality of correction tables being associated with a different amount of correction, such that each of the plurality of correction tables is selectively connected to the reference table through a soldered joint or a changeover switch.

3. A personal digital assistant having a digital camera, the digital camera comprising:
    a shutter blade connected to an electromagnetic actuator, such that the shutter blade is controlled by the electromagnetic actuator to open and close an exposure aperture;
    an image sensor photoelectrically converting light from an object into image information in accordance with photography;
    an image processing circuit (i) storing the image information converted from the light by the image sensor in an image memory, and (ii) including terminals for connecting the image processing circuit to an estimation display device to enable the estimation display device to retrieve the image information from the image memory during an assembly adjustment of the digital camera to ascertain an amount of light for the photography;
    an exposure control circuit including a reference table for controlling an amount of light exposure and including a correction table allowing the amount of light exposure controlled by the reference table to be corrected, wherein the correction table is selectively connected to the reference table, according to a need based on a result of an estimation performed by the estimation display device connected to one of the terminals of the image processing circuit only when the assembly adjustment of the digital camera is performed; and
    a driving circuit driving the electromagnetic actuator according to an output signal of the exposure control circuit.

* * * * *